April 24, 1956     O. A. HOLLAND     2,742,975
QUICK DISCONNECT FOR TRACTOR-TRAILER AIR HOSES
Original Filed Aug. 5, 1952     2 Sheets-Sheet 1
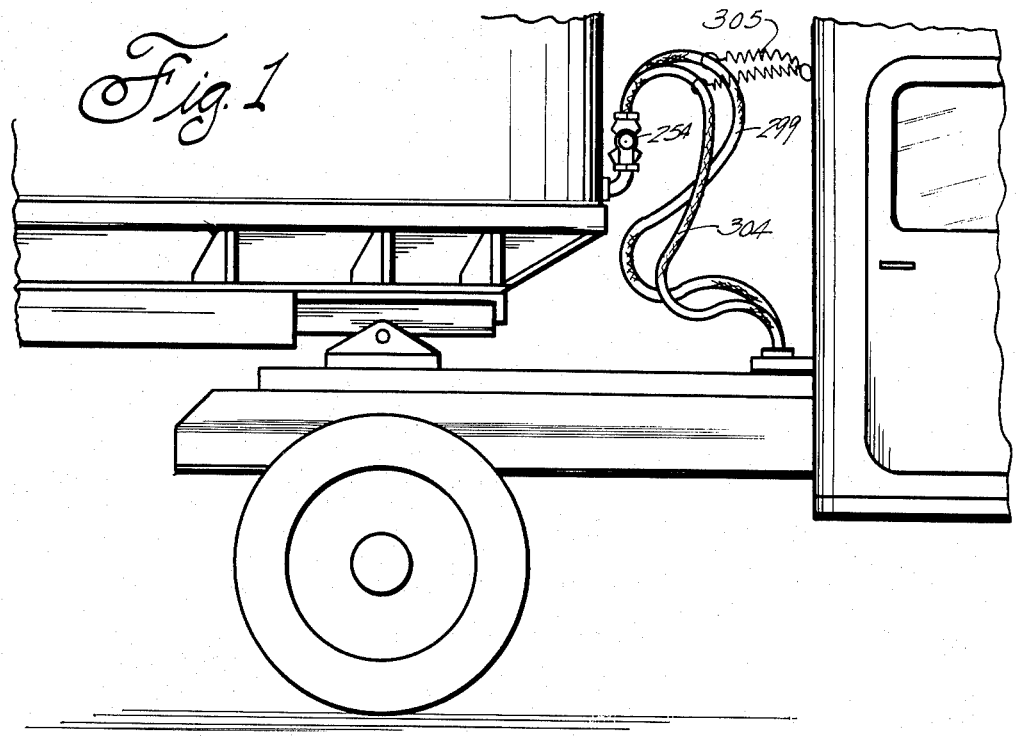
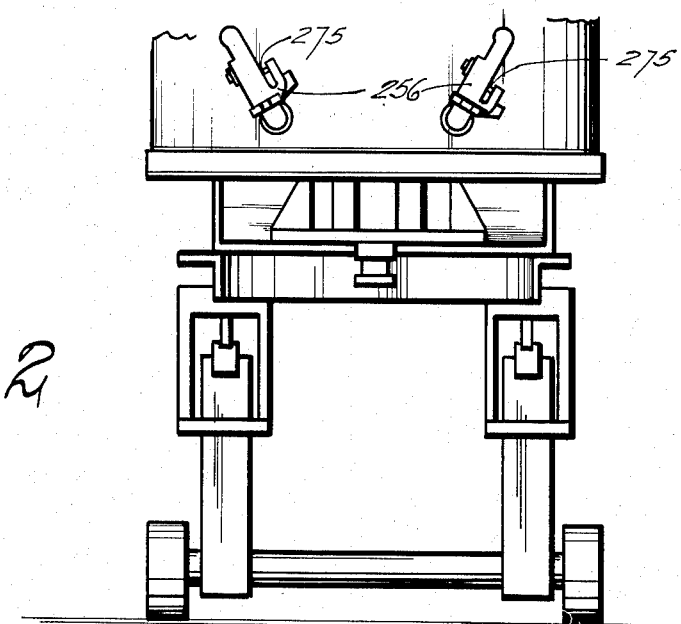

April 24, 1956     O. A. HOLLAND     2,742,975
QUICK DISCONNECT FOR TRACTOR-TRAILER AIR HOSES
Original Filed Aug. 5, 1952     2 Sheets-Sheet 2
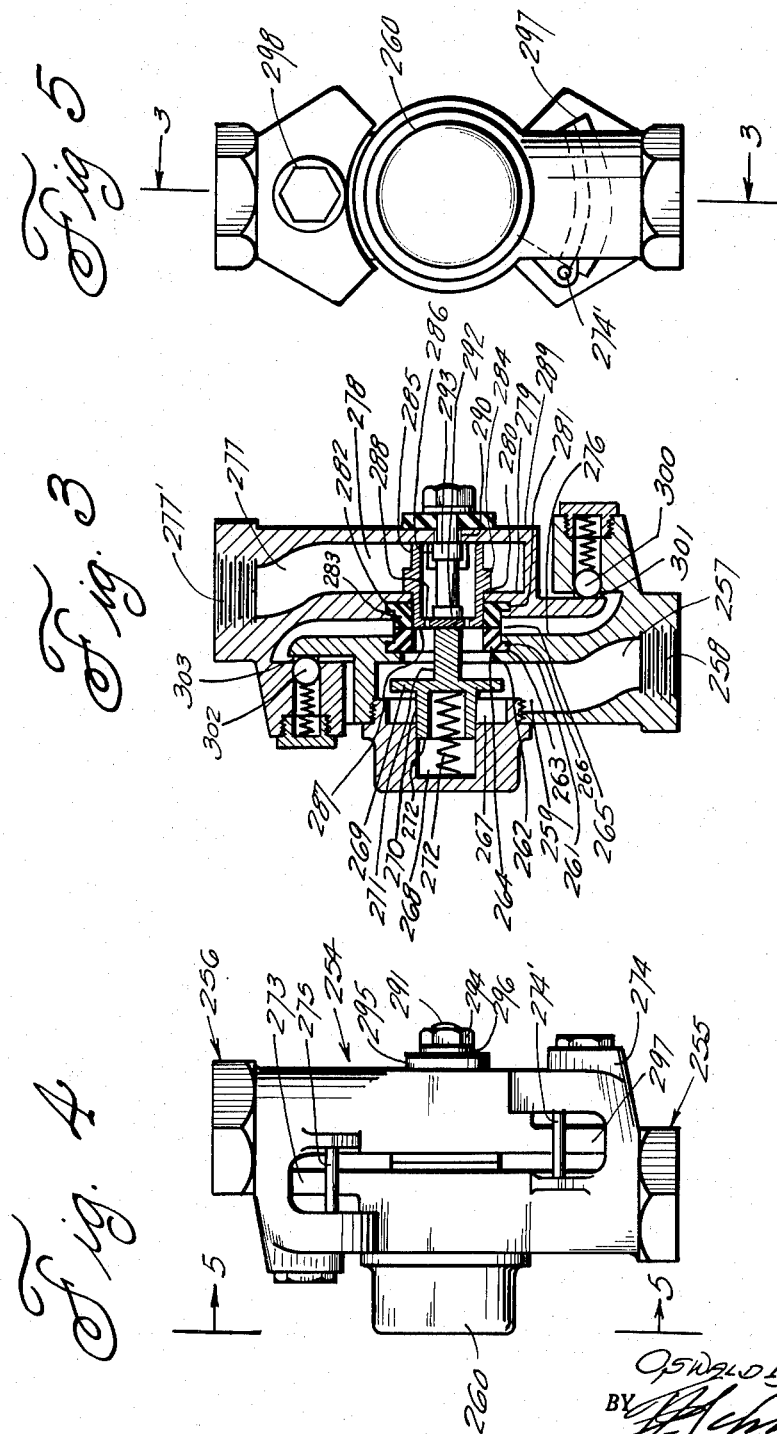
INVENTOR.
Oswald A. Holland

United States Patent Office 2,742,975
Patented Apr. 24, 1956

2,742,975

QUICK DISCONNECT FOR TRACTOR-TRAILER AIR HOSES

Oswald A. Holland, Hammonton, N. J.

Original application August 5, 1952, Serial No. 302,855. Divided and this application June 23, 1954, Serial No. 438,883

1 Claim. (Cl. 183—39)

(Granted under Title 35, U. S. Code (1952), sec. 266)

The invention described herein may be manufactured and used by or for the Government of the United States of America for governmental purposes without the payment of any royalties thereon or therefor.

This application is a division of my co-pending application Serial No. 302,855, filed August 5, 1952.

This invention relates to the art of motor vehicles and particularly to coupling and uncoupling equipment for truck-tractors and semi-trailers.

It is the primary object of this invention to provide new and improved means for coupling and uncoupling tractors and trailers which means are entirely controlled by the driver of the tractor-trailer combination from within the cab of the tractor.

An object of this invention lies in the modification of air or vacuum supply hose-coupling units so that the units will automatically uncouple when the tractor is driven away from the trailer and will seal off the air or vacuum hose connected to the tractor when the coupling is separated.

Still another and final purpose of the invention is the application of the aforementioned feature to conventional tractors and trailers at low cost and without destroying the capability of the tractor or trailer to be coupled to a conventional trailer or tractor respectively.

It is noted that other automatic coupling units or fifth wheels for tractor-trailer combinations have been attempted heretofore. A brief comparison of these old systems with that of applicant described in this and in my co-pending application will serve to point out several basic differences which should be kept in mind.

First of all, the known devices require that at least the fifth wheel and landing wheels be replaced while in applicant's system only relatively inexpensive modifications to conventional equipment are needed.

Secondly, tractors equipped with automatic couplers other than that of applicant can be utilized only with trailers supplied with similarly modified equipment while a tractor or trailer furnished with applicant's modified units can still be efficiently coupled to standard units.

Thirdly, applicant retains the air or vacuum service brakes on the trailer while others must resort to less efficient mechanical brakes.

Last, but very important, vehicles equipped with applicant's invention can be uncoupled while the vehicles are in motion and fully loaded without any damage to tractor, trailer or load, a feat which was considered impossible in the past.

The invention could also be employed to great advantage in hauling explosive or inflammable materials, by the Armed Forces in combat, or wherever dangerous activities are carried on, for example on aircraft landing fields; in short, wherever the ability to quickly couple to and remove a trailer from its location may become necessary or where it may be important to quickly separate a tractor from its trailer. It will be apparent that in many emergencies expeditious coupling or uncoupling of a tractor and trailer may prevent loss of valuable equipment or personnel.

Other objects and many of the attendant advantages of this invention will be readily appreciated as the same becomes better understood by reference to the following detailed description when considered in connection with the accompanying drawings wherein:

Fig. 1 is a side elevation of the new hose coupling unit shown in coupled position on a tractor and trailer;

Fig. 2 is a front elevation of the trailer supported by the landing gear and showing hose coupling units which are part of the invention;

Fig. 3 illustrates the improved coupling unit comprising applicant's invention and is a sectional view along the line 3—3 of Fig. 5;

Fig. 4 is a front view of the coupling units joined together.

Fig. 5 is a side view of the coupling units joined together along the line 5—5 of Fig. 4.

This application is concerned with the provision of automatic uncoupling units for the vacuum or pressure hose lines so that when the upper fifth wheel has become completely disengaged from the lower fifth wheel and the tractor continues to be driven from the trailer until the slack in any vacuum or pressure hose lines between the tractor and trailer is taken up, additional relative movement of the tractor from the trailer will cause the hose couplings 254 to be separated as hereinafter described.

Hose couplings 254 each include a first coupling unit 255 and a second coupling unit 256, said first coupling unit being attached to the hose connected to the tractor and said second coupling unit being attached to the air or vacuum line on the trailer.

The first coupling unit comprises a hollow throat portion 257 internally threaded as at 258 near its free end to receive a hose fitting and merging into a circular chamber 259, said chamber also being internally threaded to receive a shouldered plug 260. End plate 261 of chamber 259 has a central bore 262 and is provided with an annular recess 263 opening into said bore. A flanged resilient washer 264 of rubber or the like material is located in said bore with face 265 of said washer projecting beyond outer face 276 of said end plate and the flange 266 of the washer being confined in the recess 263. Plug 260 is counterbored as at 267 and has a reduced central bore 268. A valve disc 269 having cylindrical axial projections 270 and 271 extending from its opposite faces serves to close the bore 262 to prevent the flow of fluid through the throat portion of said first coupling unit. Projection 270 is slidably fitted into reduced bore 268 and is counterbored at 272 to receive a compression spring 272' which normally urges the valve disc into closing position. The opposite projection 271 passes through the bore 262 and in the closed position of the valve protrudes substantially beyond the free face of washer 264. A sector 273 is arranged radially on the periphery of chamber 259 opposite the throat portion 257 and extends for approximately 30° on either side of the longitudinal center line passing through said throat portion. An arcuate locking lug 274 is formed integrally with coupling unit 255 and located diametrically opposite sector 273 spaced from the face 276 and a stop pin 274' extends between one end of locking lug 274 and outer face 276 of the end plate.

Unit 256 likewise has a hollow throat portion 277, pipe tap 277' cylindrical chamber 278 having its one end closed by end plate 279 which is provided with a bore 280 and with an annular recess 281 opening into said bore. The annular recess receives flange 282 of a flanged resilient washer 283. A cup shaped strainer 285, having a closed end 287, projects through the washer and is retained by a shoulder 284 which engages the washer. The strainer is provided with cutout portions 286 in its wall adjacent its open end and with passages 288 consisting of a series of drilled holes adjacent the edges of the closed end 287. The other end 289 of chamber 278 is formed integrally therewith and is provided with a drilled hole 290 located centrally of the end 289. A bolt 291 projects through hole 290 with its head 292 providing an abutment which engages the center of the closed end of the strainer. An adjustable shoulder 293 on bolt 291 engages one side of the end 289 of the chamber and cooperates with a nut 294 on the other side of end 289 to hold the bolt in adjusted position. A seal is effected by means of washer 295 backed by washer 296 and located under the nut 294. It may be seen that when the two coupling units are placed together in face to face relation, the closed end of the strainer or abutment will abut projection 271 of the valve disc and force it back thus allowing the flow of fluid from throat portion 257 through the valve and into throat portion 277. A passage for fluids is thereby provided between the tractor and the trailer.

The remaining structure of coupling unit 256 is similar to that of unit 255, there being a sector 297, a locking lug 298 and a stop pin 275. To couple the units 255 and 256, they are placed in face to face relation with their longitudinal center lines approximately 90° removed and with the stop pins adjacent each other. The units are then pressed together to engage sector 273 underneath lug 298 and sector 297 underneath lug 274 and rotated until an edge of sector 297 engages the stop pin 274 on unit 255 and an edge of sector 273 engages stop pin 275. At this point, a spring pressed ball detent 300 in locking lug 274 drops into a notch 301 provided in sector 297 and a similar ball detent 302 in lug 298 mates with a notch 303 in sector 273 to help maintain the units in assembled position.

Whenever the tractor is uncoupled from the trailer and moved away, slack is taken up on hoses 299 and 304 which extend from the air, vacuum or other fluid supply on the tractor to the trailer. These tensions support springs 305 causing a pulling force to be imposed on coupling 254. This force rotates unit 255 with respect to unit 256 and when the units are rotated approximately 60° relative to each other so that sectors 273 and 297 are disengaged from locking lugs 298 and 274 respectively, the units will come apart and spring 272 will seat the valve disc 269 sealing off the supply hose. Coupling units 256, attached to the trailer are disposed at an angle to facilitate coupling and uncoupling of the fluid lines. Conventional equipment on trailers will respond to a break in the fluid line which causes the line to impose atmospheric pressure on the equipment by applying the trailer brakes. Therefore, when the tractor and trailer are uncoupled and the units 255 and 256 separated from each other, unit 256 will be open to the atmosphere and the trailer brakes will be applied, bringing the trailer to a stop supported by its landing wheels which will also have been lowered by the uncoupling process are hereinbefore described.

It may be seen, therefore, that applicant has provided safe, efficient means controlled by the driver of the vehicles for coupling and uncoupling a truck-tractor and semi-trailer wherein only the fluid supply hose need be coupled manually and wherein the entire uncoupling process requires no manual operations outside the cab and may be performed while the vehicles are moving.

Obviously many modifications and variations of the present invention are possible in the light of the above teachings. It is, therefore, to be understood that within the scope of the appended claim the invention may be practiced otherwise than as specifically described.

What is claimed is:

In coupling apparatus for a track-tractor and semi-trailer a hose coupling comprising a first unit attached to the trailer and a second unit attached to a hose line on the tractor, said first unit having a first opening for permitting the flow of fluid delivered from said second unit and including a rigid cup-shaped strainer with its closed end projecting into said opening, an adjustable abutment for presetting the distance said strainer projects into the opening, said second unit including a second opening mating with the opening in said first unit, a valve disc seating to close said second opening, a projection on said valve disc extending through the second opening and engageable with the closed end of said strainer to keep the valve disc from seating when the units are in coupled relation and a compression spring urging said valve disc into closed position.

References Cited in the file of this patent

UNITED STATES PATENTS

| | | |
|---|---|---|
| 723,767 | Whiting | Mar. 24, 1903 |
| 993,152 | Caracristi | May 23, 1911 |
| 1,013,418 | Michaelson | Jan. 2, 1912 |
| 1,185,309 | Haeseler | May 30, 1916 |
| 2,247,843 | Kamenanovic | July 1, 1941 |
| 2,330,413 | Eaton | Sept. 28, 1943 |
| 2,335,825 | Eaton et al. | Nov. 30, 1943 |
| 2,537,095 | Schroeder | Jan. 9, 1951 |
| 2,641,272 | Seale | June 9, 1953 |